July 24, 1956
C. H. LEIBFRIED
2,756,014
SPRING HANGERS
Filed March 15, 1954
2 Sheets-Sheet 2
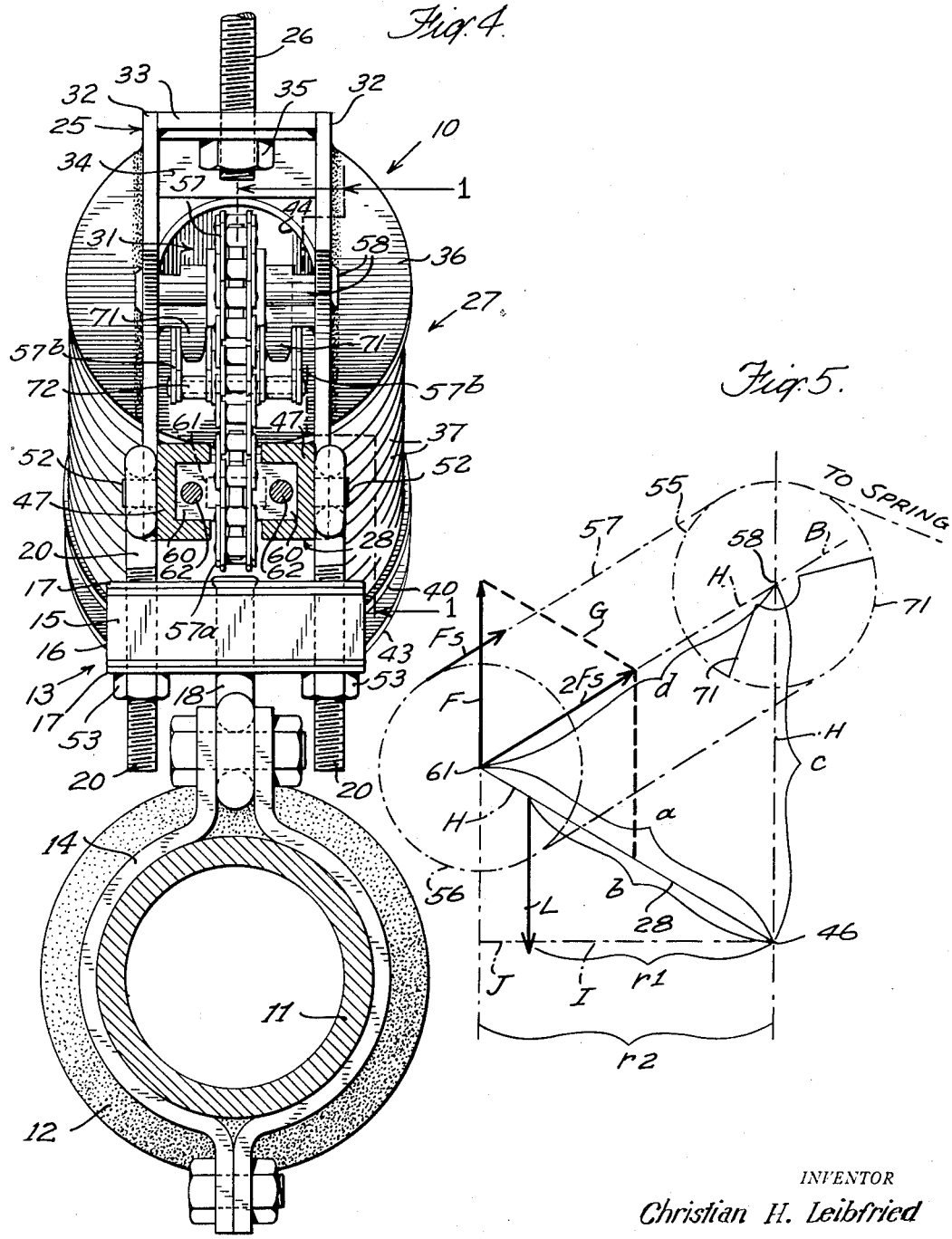
INVENTOR
Christian H. Leibfried
BY J. Augustus Nemma
ATTORNEY

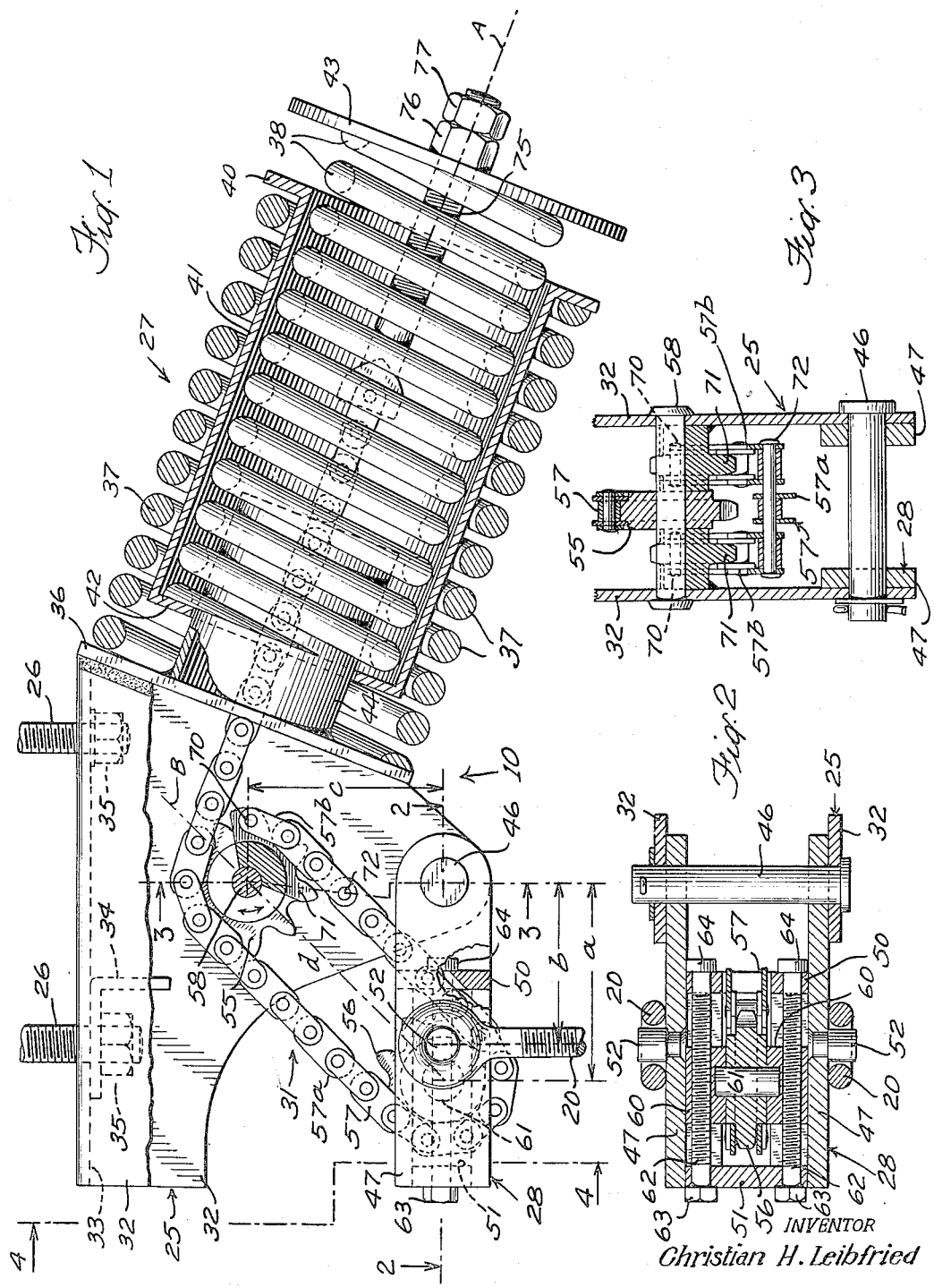

2,756,014

SPRING HANGERS

Christian H. Leibfried, New York, N. Y., assignor to C. H. Leibfried Manufacturing Corporation, Kings County, N. Y., a corporation of New York Application March 15, 1954, Serial No. 416,223

8 Claims. (Cl. 248—54)

The present invention relates to spring hangers of the so-called constant support type for sustaining a movable load, such as a pipe, with invariable force, as said load moves up and down.

Considerable changes in the temperature of fluids, such as steam, carried by a pipe system having, for example, a horizontal pipe section and a vertical pipe section or riser connected thereto, will cause this vertical pipe section to expand and contract and the horizontal pipe section thereby to rise and fall. Consequently, there exists the problem of providing a pipe hanger which will exert a supporting force to the horizontal pipe section, as this pipe section rises and falls. Where the range of travel or displacement of a pipe section is comparatively large, this pipe section should be sustained by a support of constant effect, regardless of the movement of this pipe section. If this pipe section is not properly supported at all times, its travel may cause misalignment and may impose destructive stresses upon the pipe section itself, or upon the pipe fittings, or upon the apparatus to which the pipe section is connected.

The object of the present invention is to provide a new and improved spring hanger of the constant support type, (1) which will afford an accurate constant counterbalance for the load to be supported thereby throughout a range of load travel, (2) which can be easily adjusted and preset to accommodate different loads and different ranges of load travel, (3) which is compact and requires minimum of headroom for installation, (4) which has a minimum of movable parts, (5) which is comparatively inexpensive to manufacture and easy to install and maintain and (6) which fulfills all critical pipe support requirements.

In accordance with certain features of the present invention, the spring hanger comprises a frame or bracket adapted to be set up in fixed position when installed, a spring mounted on said frame along a fixed axis, a load carrying member supported for movement as the load, such as pipe, moves through a range of travel, and a force transmitting mechanism coupling said spring and said load carrying member and designed to transmit the movement of the load carrying member resulting from the vertical movement of the load to the spring with such mechanical compensation, as to maintain a constant supporting spring force on said load, as said load rises and falls, without varying the direction of the force directly deflecting said spring. This spring is desirably in the form of a coil spring and the deflecting force is applied thereto along the axis of said spring and since this force direction remains constant, no moment is applied to said spring tending to turn it. The spring, therefore, need not be pivotally supported.

As an additional feature, the load carrying member is in the form of a lever mounted on a fixed axis on the bracket and the force transmitting mechanism described consists of a belt drive comprising a circular idler wheel, such as a sprocket, centrically supported on a fixed axis on the bracket, a circular idler wheel, such as a sprocket, centrically supported on the load carrying lever for rotation about its axis and for movement bodily with said lever, and a flexible belt, such as a chain, trained over said wheels in driving engagement therewith and having one end secured to the spring to deflect said spring axially according to the tension force on said belt and the other end anchored to a fixed point with respect to said bracket. As the load carrying lever moves angularly about its fixed pivot support in response to the vertical movement of the load, the wheel carried by the lever moves bodily therewith with respect to the other wheel, causing the belt to move lengthwise as it accommodates itself automatically to the variation between the centers of the two wheels. This lengthwise movement of the belt transmitted to the spring, deflects the spring accordingly. By presetting the deflection of the spring from its natural unstressed state to twice the distance between the centers of the wheels, the extent of belt movement will automatically compensate for changes in the angularity of the common axis line of the two wheels with respect to the fixed axis of the spring resulting from vertical movement of the load, thereby maintaining constant spring support on said load through the lever. With this construction, the axis of the spring can remain fixed, while the angle between the common axis line of the wheels and the spring axis, need not have any definite value and need not follow any prescribed rate of change in relation to the rate of vertical movement of the load.

As another feature of the present invention, the position of the axis of the bodily movable wheel along the load carrying lever may be adjusted according to the extent of support desired and the amount of vertical load displacement to take up.

Various other objects, features and advantages of the present invention are apparent from the following description and from the accompanying drawings, in which Figure 1 is a view partly in longitudinal section and partly in side elevation of a constant spring support or hanger, embodying the present invention, said view being taken along the lines 1—1 of Fig. 4 and showing the spring support sustaining the load approximately in the middle of its range of travel;

Fig. 2 is a detail section of the spring support taken along the lines 2—2 of Fig. 1;

Fig. 3 is a detail section of the spring support taken along the lines 3—3 of Fig. 1;

Fig. 4 is a front elevation of the spring support of Fig. 1 taken approximately along the lines 4—4 of Fig. 1 but shown in connection with the supported load, as for example, a pipe; and Fig. 5 is a diagram of forces of the spring support but in a position in which the supported load has been raised near the upper limit of its travel.

Referring to the drawings, the spring hanger 10 of the present invention is shown applied to the support of a load in the form of a horizontal pipe 11 (Fig. 4), which for example, may be a steam pipe, and which therefore is subject to thermal expansions and contractions. This pipe 11 rises and falls, due for example, to the expansion and contraction of a vertical riser in the pipe system and is shown with the usual insulating covering 12 and the usual connection 13 for supporting the pipe from the hanger 10. This connection 13, which forms no part of the present invention, is shown comprising a clamp ring 14 embracing the pipe 11, an adapter 15 consisting of a pair of channels 16 rigidly secured together at the top and bottom by tie plates 17, and a suspension eye bolt 18 anchored to said adapter and pivotally jointed to said clamp 14. A pair of suspension rods 20 forming part of the hanger 10, connect the adapter 15 to the hanger, in a manner to be described.

The spring hanger 10 constituting an embodiment of the present invention, comprises in general a frame or bracket 25 adapted to be attached in fixed position to part of the building structure (not shown) such as a beam, by means of two suspension rods 26, a spring unit 27 mounted on said bracket, a load carrying member 28 desirably in the form of a lever and more specifically in the form of a lever bar adapted to carry the load (pipe 11) through the suspension rods 20 and a transmitting mechanism 31 coupling said spring unit and said lever and designed to transmit the movement of said lever to said spring unit at a ratio, to produce a load supporting effort of constant value throughout the range of travel of said lever.

The bracket 25 is channel-shape and comprises a pair of similar opposed vertical side plates 32 and an interconnecting horizontal top plate 33, the resulting structure being reinforced by a brace 34. The suspension rods 26 are anchored at the top to the building structure or to any suitable overhead structure, such as a beam, and pass through the top plate 33 of the bracket 25. Nuts 35 threaded on to the lower ends of the suspension rods 26, serve to support the bracket at the required elevation.

Rigidly secured to the bracket 25 and extending across one end thereof at an inclined angle is a round plate 36 serving as a fixed bearing or abutment for one end of the spring unit 27. This spring unit 27 comprises a pair of compression coil springs 37 and 38 connected together in series and telescopically arranged for compactness. The outer spring 37 bears at one end against the fixed abutment plate 36 and at the other end against an end flange 40 on a cup-shaped plunger 41 slidable in said outer spring. The inner spring 38 extends into the plunger 41 and at one end seats against the base 42 of said plunger and at the other end against a movable spring deflecting plate 43. A tube 44 rigidly secured to the fixed abutment plate 36 and passing with a slide fit through a hole in the base 42 of the plunger 41, guides the inner spring 38 for axial compression. The spring deflecting plate 43 is moved in response to the travel of the load (pipe 11), through the force transmitting system 31, in the manner to be described, to deform the spring unit 27 compressively and thereby to support the load from said spring unit.

The axis A of the spring unit 27 is fixed and extends in an oblique angle with repect to the horizontal, to cause said spring unit to slant downwardly away from the bracket 25 and below the top thereof and to assure thereby clearance for the spring unit against possible interference from an overhead supporting structure.

The load carrying lever 28 extends into the space between the side bracket plates 32 with a snug pivot fit and is supported on said bracket plates by means of a pivot pin 46. This lever 28 comprises a pair of parallel channels 47 with the open sides thereof facing each other, the flanges along each of said channels being removed from the inner pivotal supported sections thereof, to receive a cross-plate 50, which is between said channels contiguous to the inner ends of the flanges on the outer sections of said channels and which is rigidly connected to said channels, as for example, by welding. A cross-plate 51 on the outer ends of the channels 47 extends snugly into the hollows of said channels and is rigidly connected to said channels, as for example, by welding. The channels 47 with the cross-plates 50 and 51 form a rigid structure defining the lever 28.

Secured to the two lever channels 47 are axially aligned pins 52 engaged by the eyes at the upper ends of the suspension rods 20 to support pivotally these rods therefrom, the position of these pins 52 with respect to the pivot pin 46 depending on the required total vertical travel of the load. The lower ends of these suspension rods 20 extend through the tie plates 17 of the adapter 15 and are adjustably attached thereto by nuts 53.

The force transmitting mechanism 31 between the spring unit 27 and the lever 28 is in the form of a belt drive comprising a pair of circular idler wheels 55 and 56 of equal diameter, each centrically supported, and a flexible belt 57 trained over said wheels in drive engagement therewith and having one end anchored in a fixed position, the other end being secured to the spring unit 27, to deflect said spring unit. The wheels 55 and 56 are preferably in the form of sprocket wheels and the belt 57 is preferably in the form of a drive chain in mesh therewith. The upper sprocket 55 is supported between the side bracket plates 32 and centrically on an axle 58, which is mounted on said plates, so that this sprocket is maintained on a fixed axis and which is located directly above the supporting pivot pin 46 of the lever 28 in vertical alignment therewith. The other lower sprocket 56 is supported on the lever 28 and is adjustable therealong. To this end, there is provided a pair of blocks 60 fitted in the hollows of the lever channels 47 respectively with snug slide fits and spaced to receive the sprocket 56 therebetween. An axle 61 passing through the center of the sprocket 56 projects into the slide blocks 60 with a journal fit to support said sprocket on said blocks.

To adjust the position of the sprocket 56 along the lever 28, there is provided a pair of feed screws 62 passing through the slide blocks 60 respectively and threaded thereto to cause each of said blocks to move along its corresponding lever channel 47 as the corresponding feed screw 62 is rotated. Each of these feed screws 62 is journalled in the cross-plates 50 and 51 forming part of the structure of the lever 28, and has a head 63 at one end shouldered against the cross-plate 51 and hexagonally shaped to receive suitable turning tool, as for example, a wrench and a collar 64 at the other end rigid with said feed screw and shouldered against the cross-plate 50. The slide blocks 60 are shorter than the distance between the cross-plates 50 and 51 of the lever 28, to afford sufficient clearance for adjustment of said blocks between said cross-plates and thereby to permit adjustment of the position of the sprocket 56 along said lever, in response to the rotation of the feed screws 62. The distance between the axis of the lower sprocket 56 and the axis of the lever pivot support 46 is adjusted thereby according to the magnitude of the load.

The chain 57 passing over the sprockets 55 and 56, has one end anchored in fixed position in relation to the bracket 25 by means of pins 70. To allow the end portions of the chain 57 near its anchored point to be guided along the circular periphery of the upper rotatable sprocket 55, as the sprocket and chain unit 55, 56, 57 is swung about the axis of said sprocket 55, there is provided a pair of sector sprockets 71 flanking said sprocket 55 and rigidly secured to the fixed bracket plates 32, as for example, by welding. The chain 57 consists of a single centered section 57a in mesh with one side of the upper rotatable sprocket 56 and twin shorter sections 57b near its anchored end pivotally secured to the end of said single chain section 57a by means of a pin 72 and meshing with the fixed sector sprockets 71 respectively. Each of the anchoring pins 70 passes through a chain section 57b and through the corresponding fixed sector sprocket 71 meshing therewith.

The other end of the chain 57 is secured to the spring unit 27 to compress said spring unit and to sustain thereby the load with constant reaction. For that purpose, the centered section 57a of the chain 57 passes over the upper rotatable sprocket 55, veers tangentially therefrom through a hole in the fixed abutment plate 36 and through the guide tube 44 in the direction of the spring axis A and is secured to one end of a spring stressing rod 75 along said spring axis. This spring stressing rod 75 passes through the spring deflecting plate 43 and is fastened thereto by means of a securing nut 76 and a locknut 77 threaded thereon.

As will be pointed out hereinafter in connection with the analysis of the force diagram of Fig. 5, the load carried by the lever 28 through the suspension rods 20, will vary directly and inversely according to fixed and set factors, if the compressive deflection of the spring unit 27 from the natural unstressed condition is set at twice the distance between the axis of the sprocket 55 and the axis of the sprocket 56. This required amount of deflection in the spring unit 27 can be set by turning the securing nuts 76 on the spring stressing rod 75, until the required spring deflection is attained.

In the operation of the spring hanger 10 of the present invention, the load of the pipe 11 transmitted to the lever 28 through the suspension rods 20 is in turn transmitted to the lower sprocket 56 and thereby to the chain 57. The resulting tension on the chain 57 is transferred to the spring deflecting plate 43 and in turn to the springs 37 and 38, so that the pipe 11 will be spring-supported.

As the pipe 11 moves up and down as the result of thermal expansion or contraction, the lever 28 moves angularly about the axis of its pivot support 46. In Fig. 1 the lever 28 is shown in horizontal position midway between its two extreme positions of travel. As this lever 28 moves angularly about the axis of its pivot support 46, the sprocket 56 carried thereby moves along an arc centered about said axis. This causes variation in the distance between the axes of the sprockets 55 and 56, and the chain 57 to vary in length accordingly. This variation in the length of the chain 57 is in turn transferred to the spring deflecting plate 43 and thereby to the springs 37 and 38. Therefore, if the deflection of the springs 37 and 38 is preset to equal twice the distance between the axes of the sprockets 55 and 56 in any one position of the lever 28, as the lever is moved angularly by the vertical travel of the pipe 11, the resulting variation in the distance between sprocket axes will cause a corresponding variation in the deflections of said springs, so that this relation between the extent of deflection of the springs and the distance between the sprocket axes is maintained constant in all positions of said lever.

The force of the springs 37 and 38 transmitted to the lever 28 through the chain 57 and to the axis of the lower sprocket 56 supported on said lever produces a moment on said lever balancing the moment produced on the lever by the load of the pipe 11 acting thereon through the suspension rods 20. With the deflection of the spring unit 27 preset as described, the counterbalancing force of said spring unit acting on the lever 28 at the axis of the sprocket 56, will so vary with movements of the lever 28, that the supporting force transmitted to the pipe 11 through the suspension rods 20 will remain constant.

Fig. 5 is a force diagram of the spring hanger 10, in which the lever 28 has been angularly elevated from the intermediate position shown in Figs. 1–4, to near the upper limit of its travel. If the tension on the chain 57 corresponding to the pull on the spring unit 27 is indicated as $Fs$, then since the chain acts with two forces $Fs$ on opposite sides of the sprocket 56, the resultant force at the axis of said sprocket and along the common line B of the axes of the sprockets 55 and 56 will be $2Fs$. Since the deflection of the spring unit 27 has been set at twice the distance between the axes of the sprockets 55 and 56

$$Fs = 2dk$$

or $$2Fs = 4dk \qquad (1)$$

where $d$ equals the distance between the axes of the sprockets 55 and 56 and $k$ is the stiffness of the spring unit 27. From a parallelogram of forces, the force $2Fs$ acting on the lever 28 and directed along the common line B of the sprocket axes is resolved into two component forces, one of which is directed along the line of the lever and therefore has no turning effect on said lever, while the other component force indicated as F extends vertically. Considering the two triangles G and H, it is found that these two triangles are similar, so that the following relationship is present $$\frac{F}{c} = \frac{2Fs}{d} \qquad (2)$$

Substituting into equation (2) the value of $Fs$ from equation (1), there is obtained the relationship $$F = 4kc \qquad (3)$$

Taking moments about the pivot axis of the lever 28, there is obtained $$Lr1 = Fr2$$

or $$L = \frac{Fr2}{r1} \qquad (4)$$

Since the two triangles I and J incorporating the sides $r1$ and $r2$ respectively are similar, $$\frac{r2}{r1} = \frac{a}{b} \qquad (5)$$

Substituting into equation (4), the value of F from equation (3) and the value of $r2/r1$ from equation (5), we obtain $$L = \frac{4kca}{b} \qquad (6)$$

It is seen from equation (6), that the force supporting the pipe 11 in the vertical plane of the load carrying suspension rods 20 is directly proportional to the fixed distance $c$ between the axis of the upper sprocket 55 and the pivot axis of the lever pin 46 and to the preset or adjusted distance $a$ between this pivot lever axis and the axis of the lower sprocket 56 and is inversely proportional to the fixed distance $b$ between the point of suspension of the load on lever 28 and said pivot lever axis. These distances are fixed or preset and since no variable factors in the value of the load supporting force L in equation (6) are involved, this load force remains constant during the full cycle of thermal displacement of the load.

It should be noted that the two sprockets 55 and 56 are of the same effective diameter, so that the two opposite runs of the chains 57 are parallel to the common line B of the axes of these sprockets and remain so during the full travel of the levers 28. If one of these sprockets should, however, be larger than the other, then the two opposed chain runs would be inclined with respect to the common line B of the axes of the sprockets 55 and 56, and this would introduce into the value of the load supporting force L a function of the angle between said chain runs and said common axis line. Since this angle would vary according to the angular position of the lever 28, this condition would inject a variable factor into the value of the load supporting force, adversely affecting thereby the constancy of said value. It is therefore preferred to have the two sprockets 55 and 56 of equal diameter to obviate this varying condition.

It should also be noted that the axis of the upper sprocket 55 and the pivot axis of the lever 28 are in vertical alignment so that the value of $c$ in equation (6) is invariable in all angular positions of the lever. If the axis of the upper sprocket 55 and the pivot axis of the lever 28 are out of vertical alignment, then the vertical distance between the sprocket axis and the lever will vary according to the angular position of the lever, thereby injecting into formula (6) a variable factor affecting adversely the constancy of the load sustaining effort.

The spring unit 27 is supported along the fixed axis A, since the direction of the chain pull on said spring unit remains constantly along said axis and therefore exerts no turning force thereon. By avoiding the use of a pivotally supported spring unit and a hanger mechanism in which said spring unit is turned about its pivotal support as the load is subjected to thermal displacement, mounting of this spring unit is simplified and sources of frictional resistances and the effects of inertia on said spring unit are avoided.

It should be noted that the angle between the fixed spring axis A and the common line B of the axes of the sprockets 55 and 56 need now follow any prescribed mathematical value or rate of change in relation to the displacement or rate of displacement of the load, thereby adding to the simplification of the hanger construction.

While the invention has been described with particular reference to a specific embodiment, it is to be understood that it is not to be limited thereto but is to be construed broadly and restricted solely by the scope of the appended claims.

What is claimed is:

1. A spring hanger for a load, comprising a bracket adapted to be attached in fixed position to a support structure, a coil spring unit mounted along a fixed axis on said bracket for expansion and contraction longitudinally along said axis, a lever supported on a fixed pivot axis on said bracket for sustaining the pull of the load thereon, and force transmitting means coupling said spring unit to said lever with compensating variations to maintain a constant pull on said load through the resistance of said spring unit irrespective of changes in the level of the load in relation to the level of the spring unit and comprising a first circular idler wheel mounted on a fixed center axis on said bracket in vertical alignment with said lever pivot axis for rotation about said center axis when the spring hanger is supported for operation, a second circular idler wheel mounted on a second center axis on said lever for rotation about the latter axis and for movement bodily with said lever, the diameters of said wheels being equal, and a belt trained around said wheels in drive engagement therewith to define two parallel runs alongside of each other on opposite sides of the common plane through the axes of said wheels, one end of said belt being fixed with respect to said bracket, the other end of said belt being connected to said spring unit to stress said spring unit longitudinally along its fixed axis according to the tension on said belt.

2. A spring hanger as described in claim 1, wherein the deflection of the coil spring unit longitudinally in all operating positions of said lever is equal to twice the distance between the axes of the wheels.

3. A spring hanger as described in claim 1, wherein said wheels are sprocket wheels and said belt is a chain in mesh with said sprocket wheels.

4. A spring hanger comprising a bracket adapted to be attached to a supporting structure in fixed position, a coil spring unit mounted on said bracket along a fixed axis passing through the center thereof for expansion and contraction longitudinally along said axis as said spring unit is stressed, a lever supported on a pivot axis on a bracket and adapted to carry a load, and means for transmitting the force of the load from said lever to said spring unit with compensating variations to maintain a constant pull on said load through the resistance of said spring unit irrespective of changes in the level of the load in relation to the level of the spring unit, comprising a first circular wheel supported on a center axis on said bracket, a second circular wheel supported on a center axis on said lever for movement therewith about said pivot axis, and a belt for stressing said spring unit passing over said wheels in drive engagement therewith and having one end section extending longitudinally along the axis of said spring unit and connected to said spring unit and having its other end section affixed to said bracket.

5. A spring hanger as described in claim 4, wherein said lever comprises a pair of channel members alongside of each other with their open sides facing each other, wherein there are provided slide blocks in the hollows of said channel members, said second wheel being supported between said channel members and between said blocks and on said blocks, and wherein there are provided adjusting screws threaded into said blocks respectively, whereby the position of said second wheel along said lever may be adjusted by turning said adjusting screws.

6. A spring hanger as described in claim 4, wherein the wheels are sprockets and the belt is a chain in mesh with said sprockets, wherein there are provided two sector sprockets affixed to said bracket and flanking said first sprocket wheel on the side thereof opposite to the side meshing with the chain as it veers off toward said spring unit and wherein said chain comprises a single center section extending to said spring unit and the portion of said chain near its fixed end comprises two similar sections secured at one end to the end of said single center section and meshing with said fixed sector sprockets respectively, the other end of said two similar chain sections being fixed with respect to said bracket.

7. A spring hanger as described in claim 4, wherein the first wheel is located with its periphery in tangential alignment with said spring axis to cause the belt to veer off tangentially from the first wheel along said spring axis for connection to said spring unit.

8. A spring hanger as described in claim 4, comprising means for supporting the second wheel on said lever for adjustment therealong.

References Cited in the file of this patent

UNITED STATES PATENTS

| | | |
|---|---|---|
| 2,129,320 | Geairns | Sept. 6, 1938 |
| 2,439,067 | Wood | Apr. 6, 1948 |
| 2,480,864 | Loepsinger | Sept. 6, 1949 |
| 2,568,149 | Grabe | Sept. 18, 1951 |
| 2,593,502 | Thompson | Apr. 22, 1952 |
| 2,615,708 | Rouverol | Oct. 28, 1952 |
| 2,664,590 | Allen | Jan. 5, 1954 |

FOREIGN PATENTS

| | | |
|---|---|---|
| 35,877 | Switzerland | of 1905 |
| 629,364 | Great Britain | Sept. 19, 1949 |